US006381983B1

United States Patent
Angelo et al.

(10) Patent No.: US 6,381,983 B1
(45) Date of Patent: May 7, 2002

(54) FILTER-DRIER WITH REPLACEABLE TUBULAR FILTER ELEMENT

(75) Inventors: Anthony J. Angelo, Forest Lake, MN (US); Michael R. Spearman, The Woodlands, TX (US); Rochelle Marie Mickschl, St. Paul, MN (US)

(73) Assignee: Porous Media Corporation, St. Paul, MN (US)

( * ) Notice: Subject to any disclaimer, the term of this patent is extended or adjusted under 35 U.S.C. 154(b) by 0 days.

(21) Appl. No.: 09/709,951

(22) Filed: Nov. 10, 2000

Related U.S. Application Data

(60) Provisional application No. 60/164,789, filed on Nov. 10, 1999, and provisional application No. 60/193,166, filed on Mar. 28, 2000.

(51) Int. Cl.⁷ .............................................. F25D 17/02
(52) U.S. Cl. ........................... 62/474; 62/475; 210/435
(58) Field of Search .......................... 62/474, 475, 470, 62/512, 77, 85, 195; 210/435, 295, DIG. 7; 55/428; 29/902

(56) References Cited

U.S. PATENT DOCUMENTS

| 3,434,599 | A | * | 3/1969 | Wischmeyer et al. |
| 4,032,457 | A | * | 6/1977 | Matchett |
| 4,320,000 | A | * | 3/1982 | Lange et al. |
| 4,838,901 | A | * | 6/1989 | Schmidt et al. |

* cited by examiner

Primary Examiner—Denise L. Esquivel
Assistant Examiner—Chen-Wen Jiang
(74) Attorney, Agent, or Firm—Marshall & Melhorn, LLC

(57) ABSTRACT

An improved filter drier for a refrigeration system having a replaceable tubular filter element is shown. A desiccant assembly is removably secured within a housing. The assembly includes a first and second molded desiccant, a hollow tubular perforated core located within said first and second molded desiccant, and a tubular filter located over said core.

68 Claims, 7 Drawing Sheets

FILTER-DRIER WITH REPLACEABLE TUBULAR FILTER ELEMENT

RELATED APPLICATIONS

This application is claiming the benefit, under 35 USC §119(e), of the provisional applications filed Nov. 10, 1999 and Mar. 28, 2000, under 35 USC §111(b), which were granted the Ser. Nos. of 60/164,789 and 60/193,166. The provisional applications, Ser. Nos. 60/164,789 and 60/193,166, are hereby incorporated by reference in their entirety.

BACKGROUND OF THE INVENTION

1. Field of the Invention

The present invention relates generally to the refrigeration industry. More particularly, the present invention relates to an apparatus used for the removal of solid particles and water from refrigerant fluids and gases. Most particularly, the present invention relates to an improved filter-drier having a replaceable tubular-type filter element, and a simplified construction.

2. Discussion of the Related Art

It is widely recognized in the refrigeration field that contaminants are present in the various fluid and gas circuits of refrigeration systems. These contaminants can include moisture, dirt, acids, sludge and varnish, and are generated from various sources including initial manufacturing debris, corrosion, compressor wear, desiccant granules, and overheating conditions.

Most commonly, acids, sludge and varnish are produced during unusual elevated, high temperature, or overheating situations. Thus, moisture and dirt are of the most concern under normal operating conditions, and most filter driers in the art are directed to removing water and solid particulates.

Water or moisture is always present in refrigeration systems. Acceptable limits vary from one unit to another, and from one refrigerant to another. Moisture is harmful even if "freeze ups" do not occur. And therefore it is desirable to keep the moisture level as low as possible.

Solid particulates such as dirt, oxides, scale, sludges, flux and metallic particles are frequently found in refrigeration systems. Numerous metallic contaminants such as cast iron dust, rust, scale, steel, copper and brass chips can damage cylinder walls, bearings, and plug capillary tubes or thermostatic expansion valve screens. In addition to mechanical damage and "plug ups", these contaminants catalyze chemical reactions that contribute to decomposition of the refrigerant-oil mixtures at elevated temperatures, and thus, it is also desirable to remove as much dirt as possible from refrigeration systems.

As a result, efforts have been made in the art to remove water and solid particulate contaminants using various devices. However, there are limitations to the effectiveness of these current filtration techniques.

Fiber glass pads and wire mesh screens have typically been used to remove solid particulants in refrigerant. Due to their construction, they have very little propensity to remove water. These pads and screens have been typically flat, and circular in shape, and located at the outlet of a housing. While this shape has advantage for fabrication costs, the effectiveness of the filtration performance has been limited. The filtration surface area of the circular shape is equal to or less than the cross-sectional area of the housing.

The results of this relatively small filtration surface can evolve in two ways. First, if the filter pads are designed to retain very small particles, which is desired for the protection of the system, the flow restriction through the pads will be very high, and the life will also be very short because of the fast contamination build-up.

Alternatively, if the filter pads are designed to have low flow restriction, the retention of the desired small particles will not occur, and the protection of the system will be compromised.

Desiccants have been used for many years to remove water and are generally constructed in two forms. Firstly, desiccant beads (approximately 0.10" in diameter) have been put into various forms (flat beds, hollow cylinders, etc.) by using materials, such as wire mesh, or perforated steel sheet, to create the desired configuration. This construction, while giving large surface areas for water removal, has very limited filtration capacity due to the large flow path channels through the bead matrix. Also, due to the loose form of the bead bed, the beads can rub against the retaining structure, as well as each other. This rubbing action can dislodge particles from the beads, and become a contaminant within the refrigeration system.

Alternatively, desiccants have also been rigidly molded into various shapes by using a combination of binders, temperature, and pressure, and are typically referred to as a desiccant core. The desiccant cores offer improved filtration characteristics due to the use of smaller desiccant granules, and their rigid form. The combination of small desiccant granules being held together creates a matrix which provides solid particulate retention capability. However, the solid particulate can be dislodged from the molded core and become a contaminant. This particulate can be generated from abrasion with other components during assembly, shipping damage, and residue from the desiccant core molding manufacturing process.

While such a filter-drier is generally satisfactory in operation, it still suffers from the aforementioned problems of limited filter area. In addition, replacing the desiccant cores is a fairly complicated operation. Thus, those skilled in the art continued to search for an improved filter-drier with a simplified structure, and increased filtration effectiveness.

SUMMARY OF THE INVENTION

The present invention solves the long standing problems in the art by providing a filter-drier with a core-type construction in place of the previously used coreless construction. A hollow support core is sealingly attached at one end thereof about an aperture in an end cap, thus providing communication with the interior of the hollow support core. The other end of the hollow support core is sealingly closed by a closure member having an aperture or protuberance to permit fastening an opposing end cap to the other end of the hollow support core. A tubular filter is placed over the hollow support core. One or more of the known molded desiccant cores are placed over the tubular filter and held in place between the end caps. Thus, filtration area is greatly increased, and a simplified construction is provided.

Thus, one of the objects of the present invention is to overcome the shortcomings of conventional filter-driers.

Another object of the present invention is to provide an improved filter-drier having a greatly increased filtration area.

A further object of the present invention is to provide a simplified construction for a filter-drier.

A still further object of the present invention is to provide a filter-drier which is more economical to manufacture.

A further object of the present invention is to provide a filter-drier having a tubular filter in place of the circular screen filter known in the prior art.

Further objects and advantages of the present invention will be apparent from the following description and appended claims, reference being made to the accompanying drawings forming a part of the specification, wherein like reference characters designate corresponding parts in the several views.

DETAILED DESCRIPTION OF THE INVENTION

According to the present invention, there is shown an apparatus to provide improved filtration effectiveness in refrigeration systems. The apparatus can be configured to fit within existing housing designs, and also provides for improved assembly and disassembly of the components within the housing.

A refrigeration circuit is generally a closed loop system. Tubing connects the various components of the system (compressor, expansion valve, heat exchanger, etc.) which is not open to the environment, except during service. For ease of understanding the present invention and improvements which are present therein, a prior art filter-drier is first described.

Figure 1:
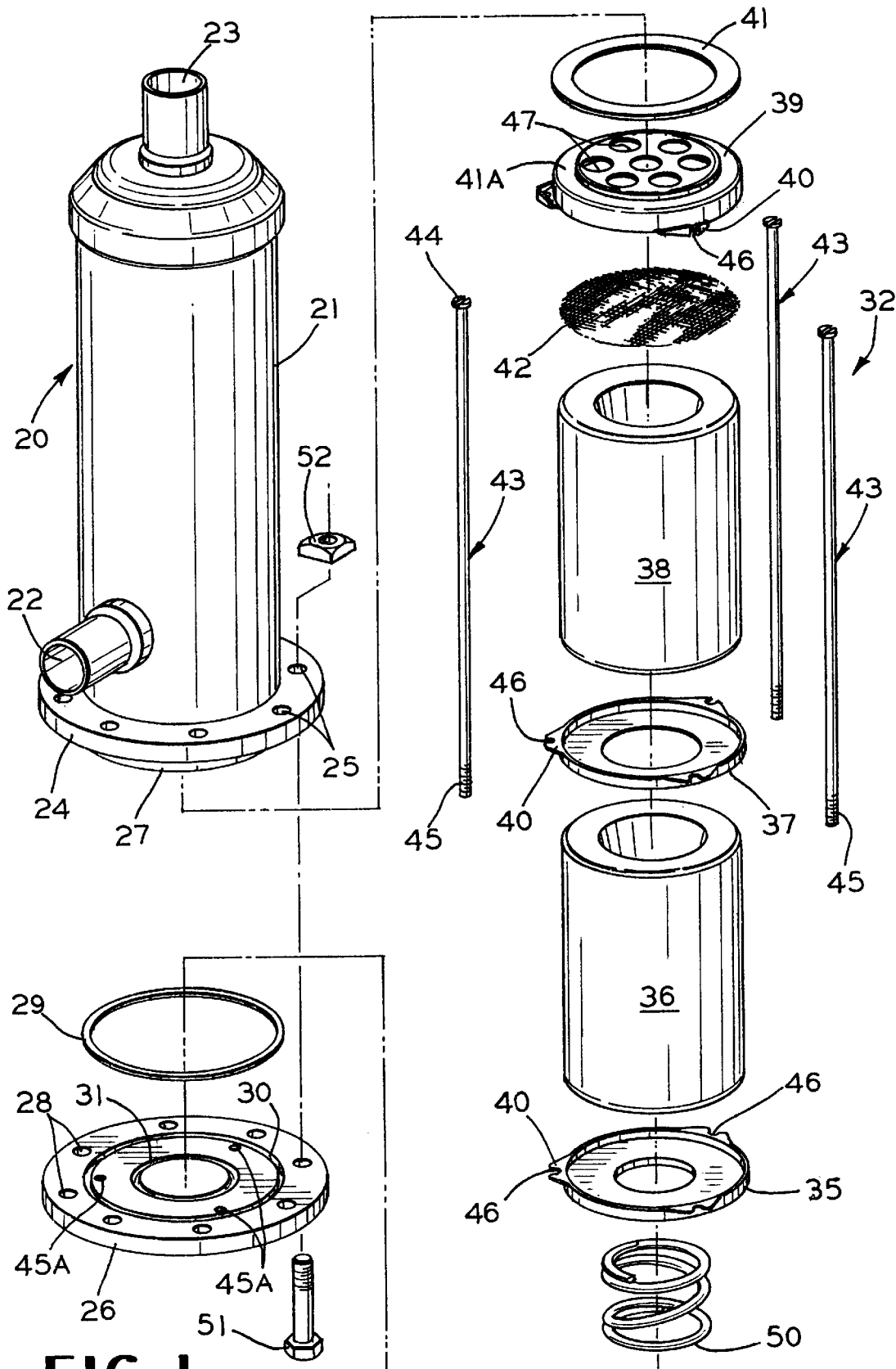
FIG. 1 is an exploded view of a known filter drier of the type having a circular flat screen filtration element.

Referring to FIG. 1, the filter-drier 20 comprises a housing 21 having an inlet 22, and an outlet 23. A flange 24 is provided on the housing 21 proximate the bottom thereof. Flange 24 has a plurality of apertures 25. To seal the open end of housing 21, a housing cover 26 is sealingly attached to the lower annular surface 27 of the housing 21. This is accomplished by providing an equal plurality of axially alignable cover apertures 28 which will align with apertures 25 when the housing cover is in place. A gasket 29 is provided in gasket groove 30 and a spring groove 31 is provided for purposes to be described below. When housing cover 26 is secured to housing 21 with bolts 51, and nuts 52, the interior of the filter-drier 20 will be sealed, and communicate with the circuit only through inlet 22 and outlet 23.

The interior of housing 20 will accept a desiccant assembly 32. The desiccant assembly 32 comprises seriatim a first end cap or core end plate 35, a first molded desiccant core 36, a core separator 37, a second molded desiccant core 38, flat mesh screen 42, and a second end cap or core base plate 39.

A plurality of radially extending retainers 40 are provided on core end plate 35, core separator 37, and core base plate 39. Slots 46 are provided in retainers 40.

A plurality of retaining screws 43 having head portions 44 and threaded portions 45 are provided. To assemble the desiccant assembly 32, the parts are assembled seriatim as previously described.

Slots 46 will be placed in axial alignment before assembly begins. Head portions 44 of the retaining screws 43 will be placed into slots 46 in retainers 40 of the core base plate 39, and the shafts of the retaining screws 43 will be laid into the slots 46 of the retainers 40 of the core separator 37 and the core end plate 35. This will position the threaded portions 45 of the retaining screws 43 below the retainers 40 in the core end plate 35.

A second gasket 41 is installed in the gasket groove 41A provided in the core base plate 39. A spring 50 is then interposed between the core end plate 35 and the spring groove 31 in the housing cover 26. The desiccant assembly is then attached to housing cover 26 by threading the threaded portions 45 of retaining screws 43 into threaded apertives 45A in housing cover 26. This assembly is inserted into housing 21, and housing cover 26 is attached to housing 21 using bolts 51 and nuts 52, thus sealingly installing desiccant assembly 32 in housing 21.

In operation, gas or fluids will flow into the inlet port 22 through the first molded desiccant 36, the second molded desiccant 38, screen 42, through openings 47, and out the outlet port 23. It should be understood that the details of construction of the prior art desiccant filter may vary somewhat from the illustration. It is common practice to use from one to four molded desiccants depending on the application, which may eliminate the need for the core separator 37, or require up to three core separators 37.

It can be seen in this construction that the area of the wire mesh screen 42 is limited, and may be less than the diameter of the housing 21. In the prior art construction there is no way to overcome this problem.

Figure 2:
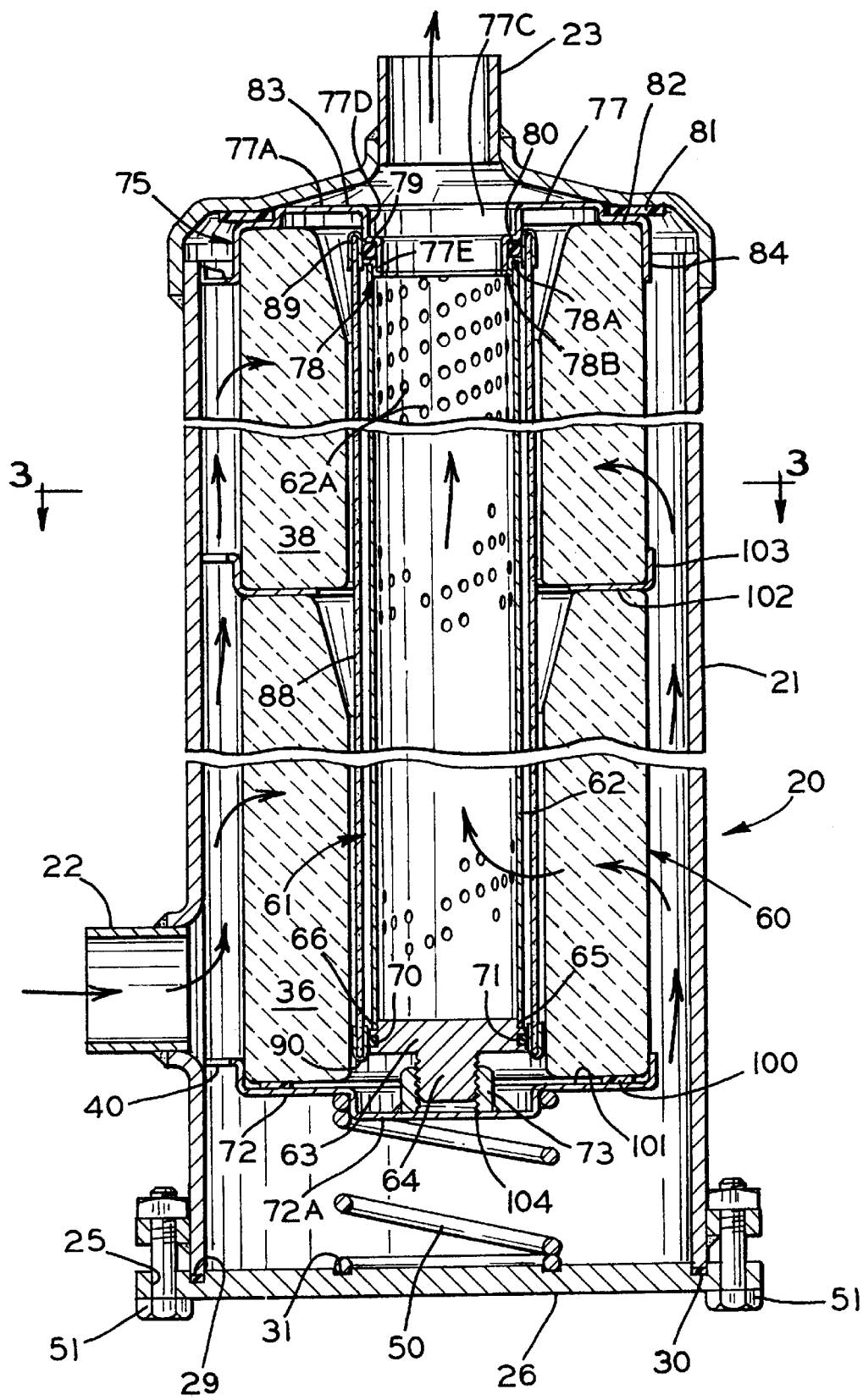
FIG. 2 is a sectional elevational view of a construction embodying the present invention.
Figure 3:
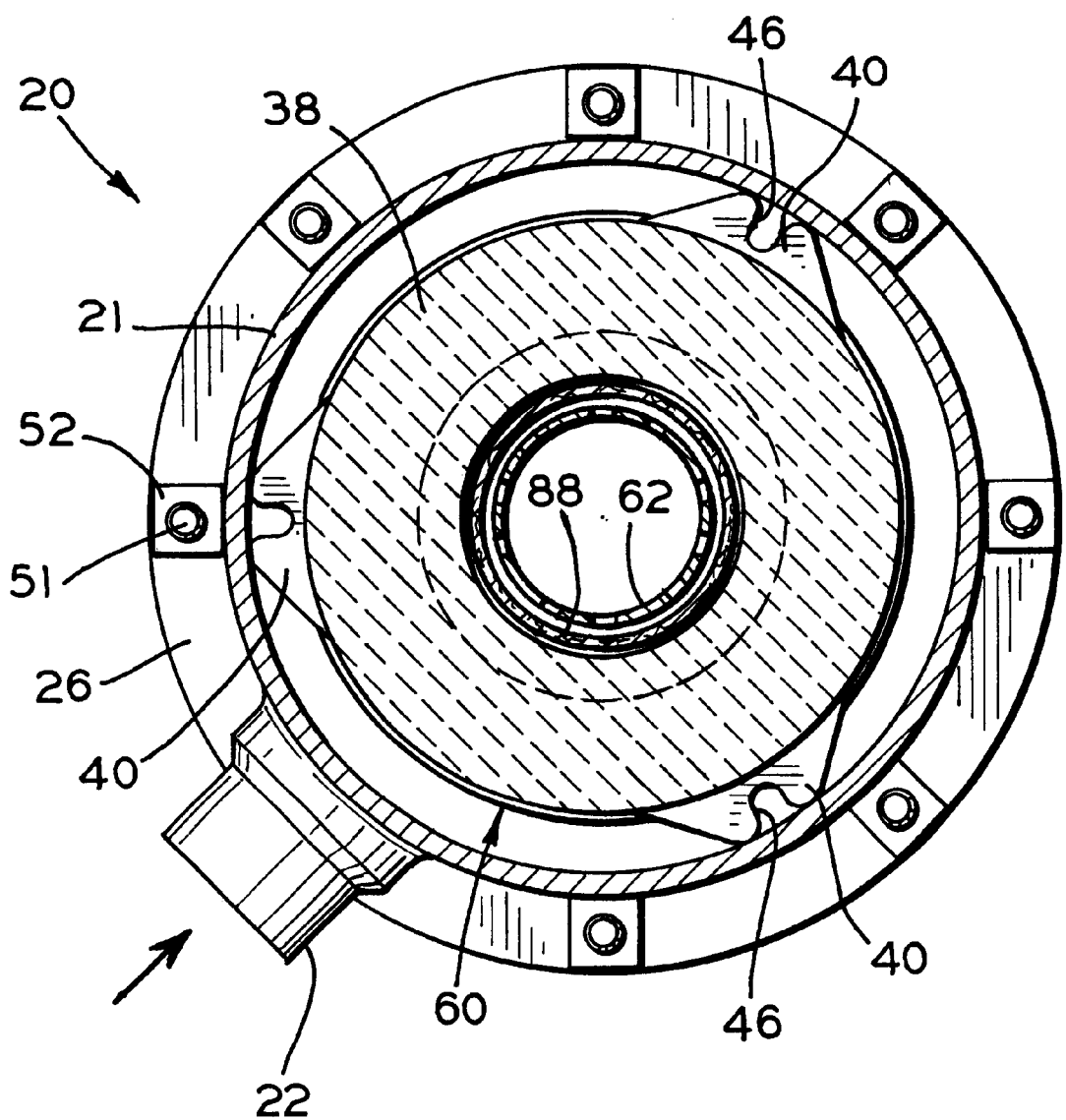
FIG. 3 is a sectional view, taken in the direction of the arrows, along the section line 3—3 of FIG. 2.

Referring now to FIGS. 2 and 3, a construction embodying the present invention is shown whereby the filter area is greatly increased over the prior art devices, as is the ease of assembly of the desiccant assembly.

The construction of the filter-drier 20 may be identical to that previously described, and will not be repeated herein. The desiccant assembly, now indicated by the numeral 60 for the purposes of clarity, is no longer coreless, as was the desiccant assembly 32 of the prior art. Instead, a perforated core assembly 61 is provided to hold the first molded desiccant 36 and the second molded desiccant 38. The perforated core assembly 61 comprises a tubular perforated core 62 having a plurality of perforations 62A, which may be of seamless, seamed, or other construction, as desired. The tubular perforated core 61 is closed at a first end by a first closure member 63. The first closure member 63 has a threaded portion or protuberance 64 for attachment to a first end cap or core end plate 72 in a manner to be described hereinafter.

The surface of the first closure member 63 opposite the threaded portion or protuberance 64 has a parametric or annular recess 65 which accepts the first end 66 of the hollow tubular perforated core 62. The perforated core 62 is fixedly attached to the first closure member 63 by the use of welding or other attachment means well known in the art. Below annular recess 65 is an annular or parametric channel 70 which accepts seal or O-ring 71 for purposes to be described.

First end cap or core end plate 72 having a mating weld nut 73 affixed thereto by means known in the art will screw onto the threaded portion or protuberance 64 of the first closure member 63.

At its other end, tubular perforated core 62 is attached to a second end cap or core base plate 75. Second end cap 75 comprises a first portion 77 attached to a second portion 78.

First portion 77 comprises a first annular portion 77A having a gasket recess 82 formed about the outer perimeter thereof and a downwardly depending sidewall 84 having an inside diameter substantially the same as the outside diameter of the second molded desiccant 38. At the inner extremity of the first portion 77A is a downwardly depending stepped wall 77C having a first step 77D and a second step 77E. The outside diameter of the stepped circular wall 77E will be essentially the same diameter as the second annular portion 78 of second end cap 75.

Second portion 78 has a radially outwardly extending flange 78A and a downwardly depending sidewall 78B. When assembled to first portion 77 of second end cap 75 an outwardly facing annular channel 79 will be formed to accept seal or O-ring 80, and the downwardly depending sidewall 78B will accept the other end of tubular perforated core 62, which will be affixed thereto by welding or other suitable means known in the art. A filter tube 88 having top U-shaped retainer 89 and lower U-shaped retainer 90 will fit over the hollow tubular perforated core 62 and seal against first O-ring 71 and second O-ring 79.

To assemble the perforated core assembly 61, the second end cap 75, having tubular perforated core 62 attached, may be placed on a flat surface, held in a jig or a fixture, or otherwise restrained. The filter tube 88 is slipped over the vertically oriented perforated core 62 until O-rings 80,71 seal against U-shaped retainers 89,90. Second desiccant core 38 is then placed over the tubular filter 88 until it comes to rest against second end cap 75. Core separator 102 is then placed over the exposed end of the second molded desiccant 38, and first molded desiccant 36 is placed over the tubular filter 88 until it meets the core separator 102. First end cap 72 is then screwed onto threaded portion 64 of the first closure member 63. The gasket 81 will then be inserted in the gasket groove 82. Generally the inside diameter of the gasket 81 will be a press fit into the gasket groove 82 so the gasket will remain in place.

Essentially the desiccant assembly 60 has been assembled upside down with respect to its position in use, as the desiccant assembly will now be inserted into the housing 21 until the gasket 81 seals against the upper portion of the housing 21. The spring 50 will be placed over the boss 72A on first end cap 72, and then the other end of spring 51 will be placed in spring groove 31 of the housing cover 26. A plurality of bolts 51 will be passed through apertures 25 in the housing cover and the radially extending flange 24 of the housing 21, nuts 52 will be applied to bolts 51 and the bolts 51 will be tightened applying pressure to the desiccant assembly 60 to force the gasket 81 into sealing engagement between the housing 21 and the second end cap 75. The entire filter-drier 20 will then be turned over and installed for use in the position shown in FIG. 2. It should be understood that the position shown is for illustrative purposes only, and the filter-drier 20 can be used in any desired position.

Air entering inlet 22 will pass through the molded desiccants 36,38 through the filter tube 88, through the perforations 62A in the hollow perforated tubular core 62, and out through the outlet 23. Solids, particulates, and water will be removed from refrigerant systems in an efficient and economical manner.

Referring to FIG. 3 it can be seen that the first end cap 72 the core separator 102 and the second end cap 75 may have retainers 40 provided in a spaced apart peripheral orientation, as in the prior art filter-drier just described. While these retainers are no longer used to hold the desiccant assembly 60 together, they do provide spacing for the assembly 60 within the housing 21.

It should be understood that more than one desiccant assembly 32 may be used, and each desiccant assembly may contain less than 2 or more than 2 desiccant cores 36. Also, the filtered drier 20 may be used without any desiccant assembly 32 or desiccant cores 36, and serve as a filter.

Figure 4:
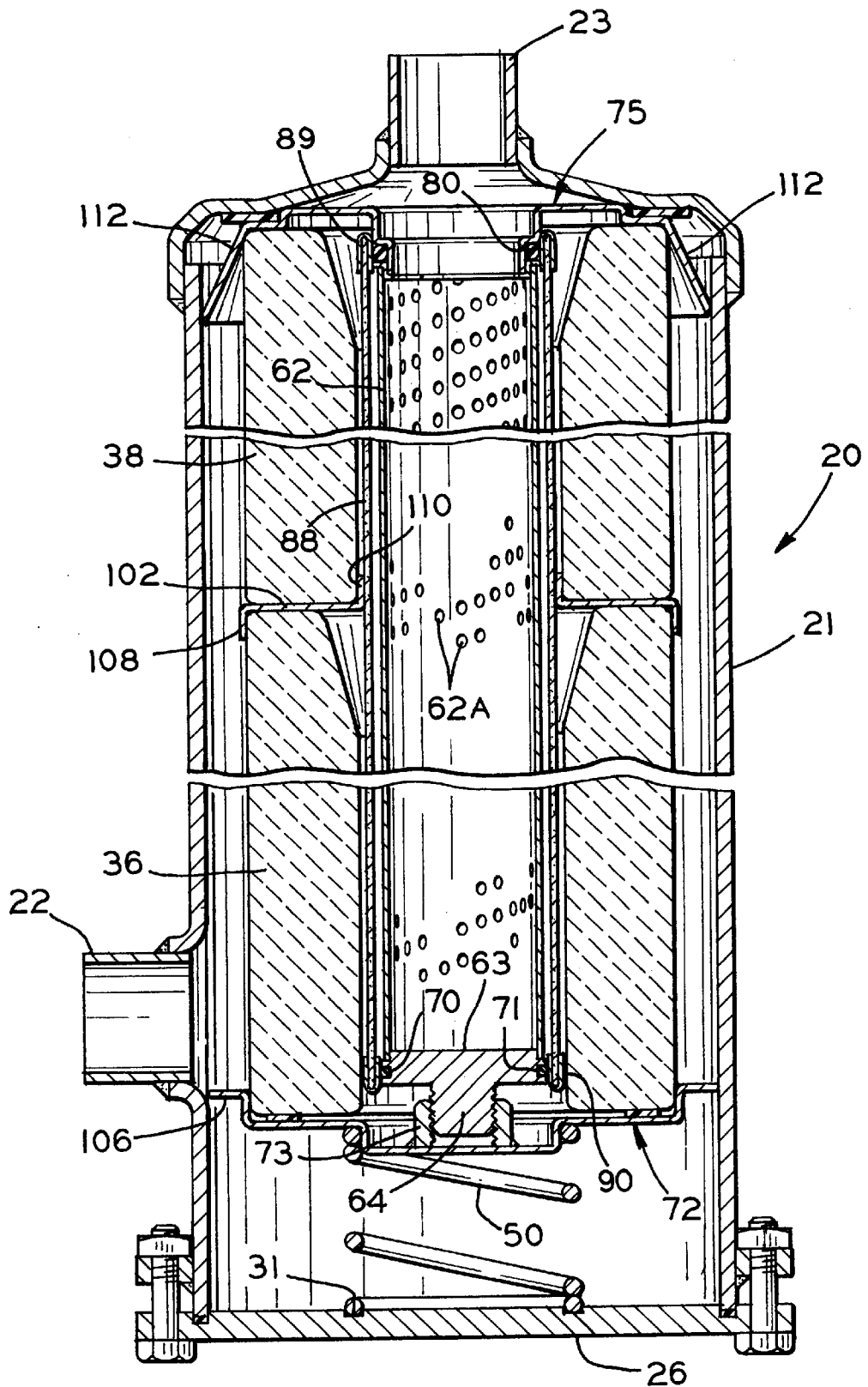
FIG. 4 is a sectional elevational view showing a modification of the construction shown in FIG. 2.
Figure 5:
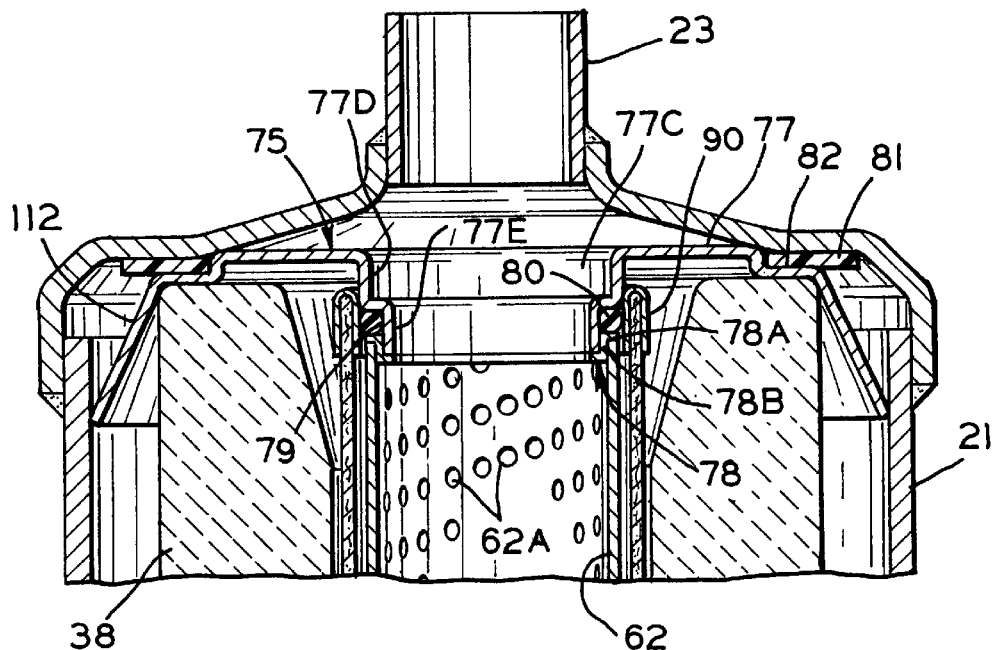
FIG. 5 is a fragmentary view of the upper portion of the construction shown in FIG. 4, on an enlarged scale.
Figure 6:
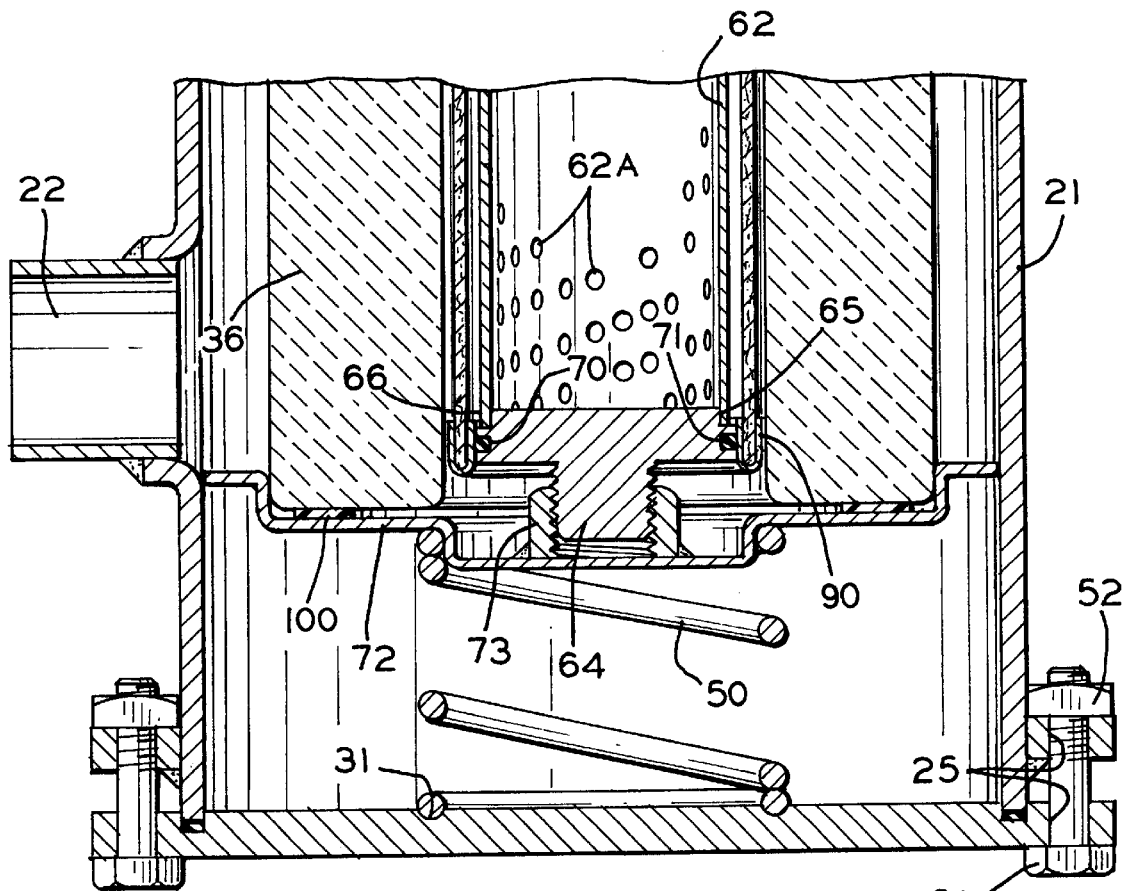
FIG. 6 is a fragmentary elevational view, on an enlarged scale, of the lower portion of the construction shown in FIG. 4, on an enlarged scale.

Referring now to FIGS. 4–6, there is shown a modification of the present invention. Essentially the construction of the modification shown in FIGS. 4–6 is identical to the construction shown in FIGS. 2–3, except for a few features. The retainers 40 previously provided on second end cap 72 or core base plate are removed and replaced by a radially extending flange 106 entirely about the periphery of the second end cap 72. The core separator 102, instead of having an upstanding perimetral wall 103 and retainers 40 thereon, has an outer down standing perimetral wall 108 and an upstanding inner perimetral wall 110 to aid in the location of the first molded desiccant 36 and the second molded desiccant 38. The inside diameter of the outer downstanding perimetral wall will be chosen to be approximately the same as the outer diameter of the first molded desiccant 36. The outside diameter of the inner upstanding perimetral wall will be approximately equal to the inside diameter of the second molded desiccant 38, while the inside diameter of the inner upstanding perimetral wall 110 will be approximately the same as the outer diameter of the filter tube 88. As before the filter tube 88 will be in sealing engagement with the first O-ring 71 and the second O-ring 80.

The second end cap or core base plate 75, instead of having the downwardly depending perimetral sidewall 84 and retainers 40 thereon has a downwardly depending, outwardly slanting, perimetral sidewall 112. The core separator still performs its function of aiding and locating of the first and second molded desiccants 38 but no longer provides the function of assisting location of the desiccant assembly 32 within the housing 21. Instead the radially extending flange 106 on the first end cap 72, and the outwardly slanted, downwardly depending, sidewall 112 on the second end cap 75 perform this function.

Figure 7:
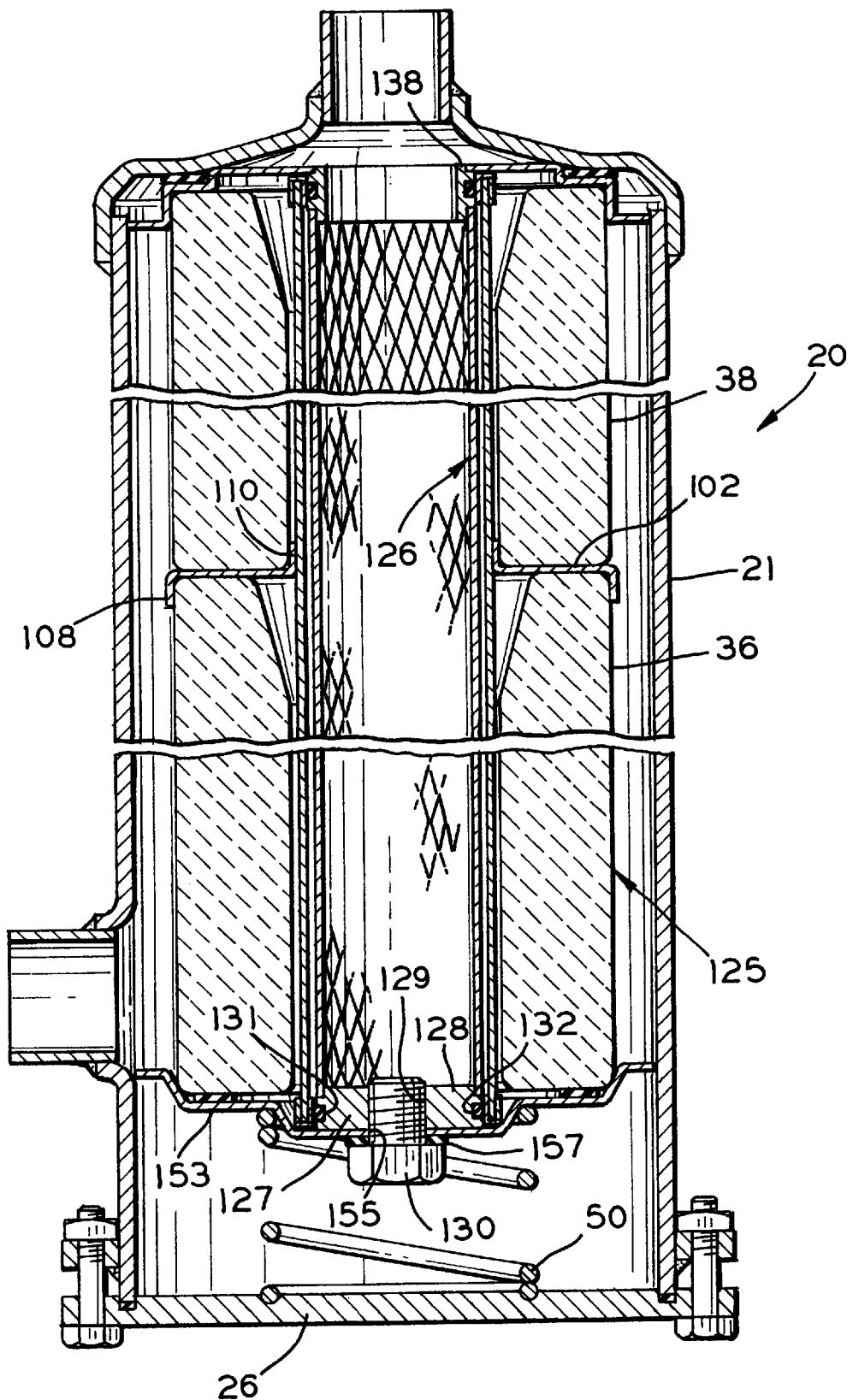
FIG. 7 is a sectional elevational view of a further modification of the present invention.
Figure 8:
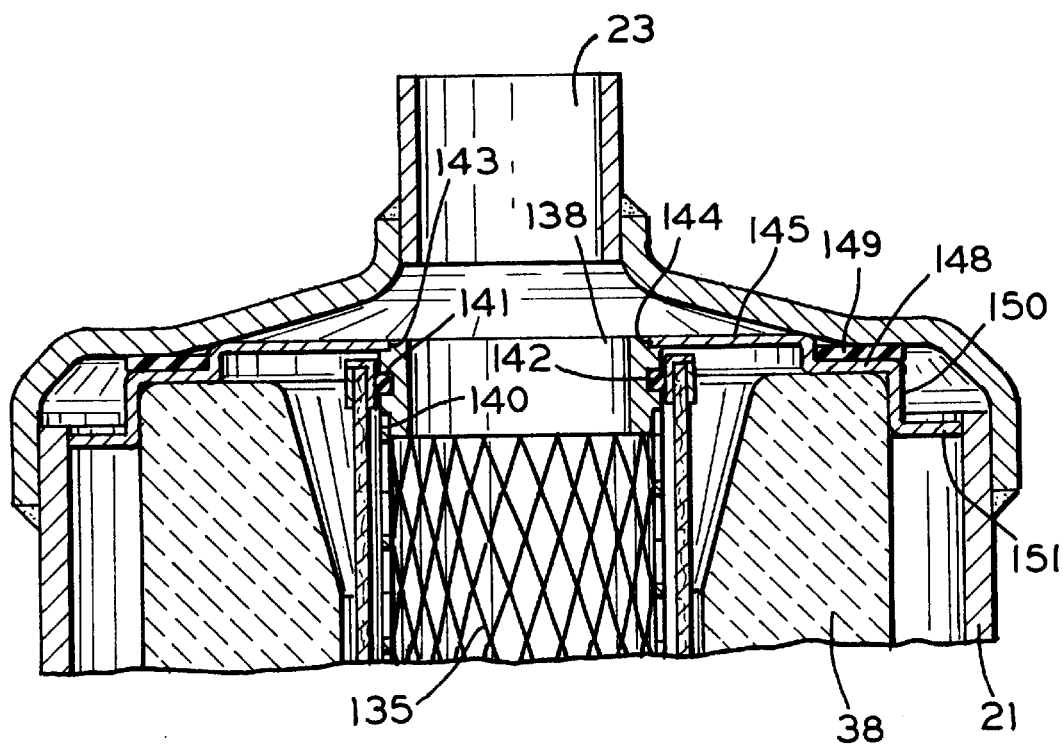
FIG. 8 is a fragmentary view of the lower portion of the construction shown in FIG. 7, on an enlarged scale.
Figure 10:
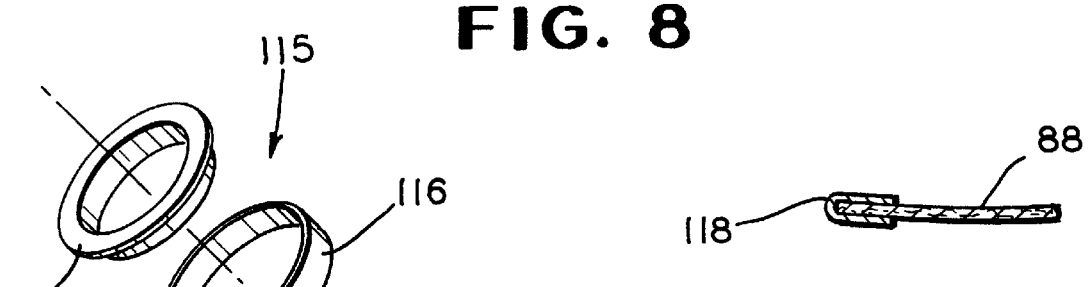
FIG. 10 is a sectional view, taken in the direction of the arrows, along the section line 10—10 of FIG. 9.
Figure 9:
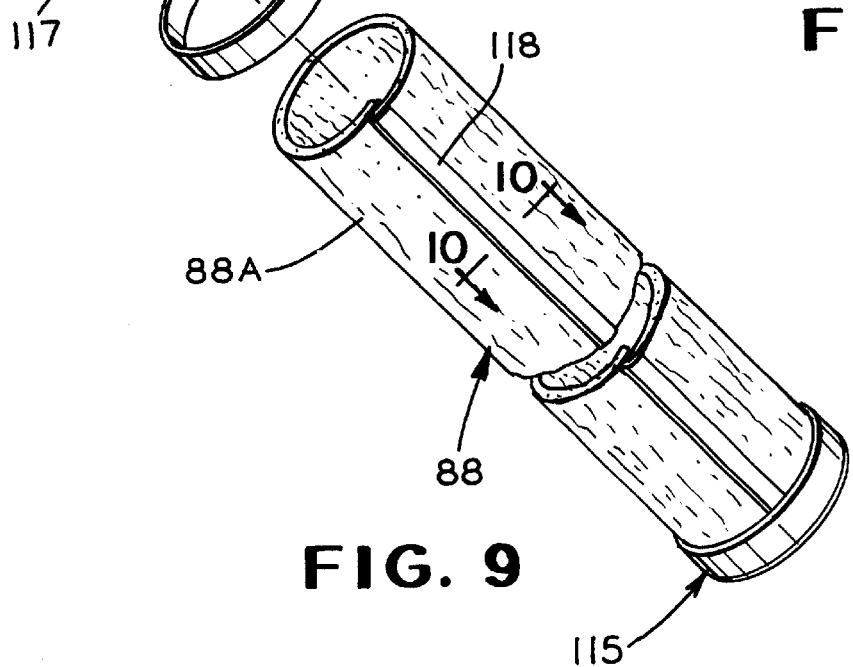
FIG. 9 is an exploded, perspective view of the tubular filter shown in FIGS. 7 and 8.

Referring now to FIGS. 7–9 a further modification of the present invention is provided which provides the same advantages, but which is easier and more economical to manufacture. A stronger filter tube (FIG. 9) is provided by replacing the U-shaped retainers 89,90 with two piece retainers 115, each comprising an annular portion 116 and an annular L-shaped portion 117 of slightly differing diameters. The filter tube is placed over the L-shaped portion and the annular portion is then placed over the filter tube (or vice versa). Since the L-shaped portion and annular shaped portion of the retaining ring are of slightly differing diameters, the filter material will be pinched between the L-shaped ring and annular ring, and will be sealingly engaged by the retainers 115. A supporting member 118 may be interposed between the annular ring portions 116 of retainers 115 and the filter material, and it will also be held in place by friction and add support to the tube.

It should be understood that the filter tube 88 may be of any construction known in the art. In the embodiment illustrated in FIG. 9, a single mat or layer of filter material or filtering medium 88A is formed into a tubular shape and inserted in the retainers 115. More than one layer of filter material or filtering medium may be used if desired. Also, the supporting member 118, if desired, may be crimped over one end of the filter material. This will help seal the ends of the mat 88A. A formed filter tube may also be used if desired. Referring to FIGS. 7 and 8, other differences in construction over those illustrated in FIGS. 4–6 may be seen.

In the modification of the invention shown in FIGS. 7–8, the construction of the desiccant assembly, now identified by the numeral 125, is modified for ease and economy of construction. The hollow tubular perforated core assembly 126 has a modified first closure member 127. The modified first closure member 127 consists of a circular end piece 128 having a central threaded opening 129, to receive a bolt or other fastening means 130. The first closure member 127 is essentially circular in shape and has an outwardly facing perimetral channel 131 (FIG. 8) containing a second O-ring 132, and a perimetral groove 133 to receive one end of the tubular core 135. The second closure member 138 is generally annular in shape and has a first groove 140 which accepts the upper end of tubular core 135, in this case made of expanded metal mesh, and enables the tubular core 135 to be securely welded or otherwise attached to second closure member 138. Second closure member 138 also has a second groove 143 which fits in a central opening 144 provided in a modified second end cap or core base plate 145.

Modified second end cap 145 has, in addition to the central opening 144, a seal groove 148 in which a seal 149 is carried, a downwardly depending sidewall 150 and a radially extending flange 151 which is annular in shape and extends from the distal end of the downwardly depending sidewall 150. The diameter of the radial flange 151 is just slightly smaller than the inside diameter of the housing 21 to help locate the modified desiccant core assembly 125 in the housing 21.

The remainder of the construction of the desiccant assembly 125 of this modification remains essentially the same as that previously described. The assembly of the desiccant assembly 125 to insert into the filter-drier housing 21 would be essentially the same except for the step of screwing on the first modified end cap 153. In this case the end cap 153 would simply be placed over the end of the first molded desiccant 136, a bolt 130 would be inserted through the opening 155 in boss 156 of the first end cap 153 and engage the threaded opening 129. A head seal 157 would be provided between the bolt 130 and the end cap 153 to prevent leakage at the point of attachment. The end cap 153 would seal by means of a further gasket 158 between the end cap 153 and first molded desiccant 36 as before.

Therefore, by carefully considering the problems present in the filter-drier industry, I have developed a novel and unique perforated core assembly for a filter drier.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for improved filtration effectiveness in refrigeration systems, comprising:
    a desiccant assembly, for removably secured within a housing, said assembly having a first and second molded desiccant, a hollow tubular perforated core located within said first and second molded desiccant, and a tubular filter located over said core.

2. The apparatus for improved filtration effectiveness in refrigeration systems, as defined in claim 1, further comprising said first molded desiccant and said second molded desiccant having an inside diameter and an outside diameter.

3. The apparatus for improved filtration effectiveness in refrigeration systems, as defined in claim 1, further comprising said tubular perforated core having a plurality of perforations.

4. The apparatus for improved filtration effectiveness in refrigeration systems, as defined in claim 1, further comprising said tubular perforated core is seamless.

5. The apparatus for improved filtration effectiveness in refrigeration systems, as defined in claim 1, further comprising said tubular perforated core is seamed.

6. The apparatus for improved filtration effectiveness in refrigeration systems, as defined in claim 1, further comprising said tubular perforated core having a first end and a second end.

7. The apparatus for improved filtration effectiveness in refrigeration systems, as defined in claim 6, further comprising said tubular perforated core is closed at said first end by a first closure member.

8. The apparatus for improved filtration effectiveness in refrigeration systems, as defined in claim 7, further comprising said first closure member having a threaded portion for attachment to a first end cap.

9. The apparatus for improved filtration effectiveness in refrigeration systems, as defined in claim 8, further comprising a surface of said first closure member opposite said threaded portion having an annular recess for accepting said first end of said tubular perforated core.

10. The apparatus for improved filtration effectiveness in refrigeration systems, as defined in claim 9, further comprising said annular recess is an annular channel for accepting a first seal.

11. The apparatus for improved filtration effectiveness in refrigeration systems, as defined in claim 8, further comprising said first end cap having a mating weld nut affixed thereto for threaded engagement with said threaded portion of said first closure member.

12. The apparatus for improved filtration effectiveness in refrigeration systems, as defined in claim 7, further comprising said perforated core is attached to said first closure member.

13. The apparatus for improved filtration effectiveness in refrigeration systems, as defined in claim 12, further comprising said perforated core is attached to said first closure member by welding.

14. The apparatus for improved filtration effectiveness in refrigeration systems, as defined in claim 7, further comprising said first end cap having retainers in a spaced apart peripheral orientation for spacing said desiccant assembly within said housing.

15. The apparatus for improved filtration effectiveness in refrigeration systems, as defined in claim 1, further comprising said tubular perforated core is attached to a second end cap.

16. The apparatus for improved filtration effectiveness in refrigeration systems, as defined in claim 15, further comprising said second end cap having a first portion attached to a second portion.

17. The apparatus for improved filtration effectiveness in refrigeration systems, as defined in claim 16, further comprising said first portion having a first annular portion.

18. The apparatus for improved filtration effectiveness in refrigeration systems, as defined in claim 17, further comprising said first annular portion having an outer perimeter, said outer perimeter of said annular portion having a gasket recess formed therein.

19. The apparatus for improved filtration effectiveness in refrigeration systems, as defined in claim 18, further comprising a gasket frictionally located within said gasket recess.

20. The apparatus for improved filtration effectiveness in refrigeration systems, as defined in claim 19, further comprising said desiccant assembly is located within said housing for said gasket to seal against said housing.

21. The apparatus for improved filtration effectiveness in refrigeration systems, as defined in claim 17, further comprising said first annular portion having a downwardly depending sidewall having a first and a second step.

22. The apparatus for improved filtration effectiveness in refrigeration systems, as defined in claim 21, further comprising said downwardly depending sidewall having an inside diameter, said inside diameter is substantially that of said outside diameter of said second molded desiccant.

23. The apparatus for improved filtration effectiveness in refrigeration systems, as defined in claim 16, further comprising a downwardly depending stepped circular wall proximate said first portion and having a first step and a second step.

24. The apparatus for improved filtration effectiveness in refrigeration systems, as defined in claim 23, further comprising said second step of said stepped circular wall having an outside diameter.

25. The apparatus for improved filtration effectiveness in refrigeration systems, as defined in claim 16, further comprising said second end cap having a diameter substantially that of said second portion of said second end cap.

26. The apparatus for improved filtration effectiveness in refrigeration systems, as defined in claim 16, further comprising said second portion having a radially outwardly extending flange and a downwardly depending sidewall.

27. The apparatus for improved filtration effectiveness in refrigeration systems, as defined in claim 26, further comprising said radially outwardly extending flange and said downwardly depending sidewall are secured to said first portion of said second end cap thereby forming an outwardly facing annular channel to accept a second seal.

28. The apparatus for improved filtration effectiveness in refrigeration systems, as defined in claim 26, further comprising said downwardly depending sidewall accepts said second end of said tubular perforated core.

29. The apparatus for improved filtration effectiveness in refrigeration systems, as defined in claim 28, further comprising said second end of said tubular perforated core is secured to said downwardly depending sidewall.

30. The apparatus for improved filtration effectiveness in refrigeration systems, as defined in claim 15, further comprising said second desiccant core is located over said tubular filter for said core to rest against said second end cap.

31. The apparatus for improved filtration effectiveness in refrigeration systems, as defined in claim 15, further comprising said second end cap having retainers in a spaced apart peripheral orientation for spacing said desiccant assembly within said housing.

32. The apparatus for improved filtration effectiveness in refrigeration systems, as defined in claim 15, further comprising said first end cap having a flange radially extending entirely about the periphery of said first end cap.

33. The apparatus for improved filtration effectiveness in refrigeration systems, as defined in claim 32, further comprising said radially extending flange on said first end cap and said downwardly depending, outwardly slanted sidewall of said second end cap locate said desiccant assembly within said housing.

34. The apparatus for improved filtration effectiveness in refrigeration systems, as defined in claim 15, further comprising said second end cap having a downwardly depending, outwardly slanting, perimetral sidewall.

35. The apparatus for improved filtration effectiveness in refrigeration systems, as defined in claim 1, further comprising said tubular filter having an upper U-shaped retainer and a lower U-shaped retainer to fit over said tubular perforated core for sealing engagement with said first seal and said second seal.

36. The apparatus for improved filtration effectiveness in refrigeration systems, as defined in claim 35, further comprising said tubular filter is located over said perforated core for said first and second seals to seal against said U-shaped upper and lower retainers.

37. The apparatus for improved filtration effectiveness in refrigeration systems, as defined in claim 1, further comprising said first molded desiccant is located over said tubular filter to contact a core separator.

38. The apparatus for improved filtration effectiveness in refrigeration systems, as defined in claim 37, further comprising said core separator located over an exposed end of said second molded desiccant for separating said first molded desiccant and said second molded desiccant.

39. The apparatus for improved filtration effectiveness in refrigeration systems, as defined in claim 38, further comprising said core separator having retainers in a spaced apart peripheral orientation for spacing said desiccant assembly within said housing.

40. The apparatus for improved filtration effectiveness refrigeration systems, as defined in claim 38, further comprising said core separator having an outer downstanding perimetral wall and an upstanding inner perimetral wall for locating said first and second molded desiccant within said housing.

41. The apparatus for improved filtration effectiveness in refrigeration systems, as defined in claim 40, further comprising said outer downstanding perimetral wall having an inside and outside diameter.

42. The apparatus for improved filtration effectiveness in refrigeration systems, as defined in claim 40, further comprising said upstanding inner perimetral wall having an inside and outside diameter.

43. The apparatus for improved filtration effectiveness in refrigeration systems, as defined in claim 42, further comprising said outside diameter of said upstanding inner perimetral wall is substantially the inside diameter of said second molded desiccant.

44. The apparatus for improved filtration effectiveness in refrigeration systems, as defined in claim 42, further comprising said inside diameter of said upstanding inner perimetral wall is substantially the outer diameter of said filter tube.

45. The apparatus for improved filtration effectiveness in refrigeration systems, as defined in claim 40, further comprising said inside diameter of said outer downstanding wall is substantially the outer diameter of said first molded desiccant.

46. The apparatus for improved filtration effectiveness in refrigeration systems, as defined in claim 1, further comprising a spring having a first end and a second end.

47. The apparatus for improved filtration effectiveness in refrigeration systems, as defined in claim 46, further comprising said spring first end located over a boss on said first end cap.

48. The apparatus for improved filtration effectiveness in refrigeration systems, as defined in claim 46, further comprising said spring second end located in a spring groove within a housing cover.

49. The apparatus for improved filtration effectiveness in refrigeration systems, as defined in claim 48, further comprising said housing cover is attached to said housing for pressure application to said desiccant assembly to force said gasket into sealing engagement between said housing and said second end cap.

50. The apparatus for improved filtration effectiveness in refrigeration systems, as defined in claim 48, further comprising said housing cover is attached to said housing by a plurality of bolts passed through apertures in said housing cover and said radially extending flange of said housing, said bolts secured to said cover and said flange with nuts.

51. The apparatus for improved filtration effectiveness in refrigeration systems, as defined in claim 1, further comprising said filter tube having at least two, two piece retainers.

52. The apparatus for improved filtration effectiveness in refrigeration systems, as defined in claim 51, further comprising said two piece retainers having an annular portion and an annular L-shaped portion of differing diameters.

53. The apparatus for improved filtration effectiveness in refrigeration systems, as defined in claim 52, further comprising said filter tube located over said L-shaped portion and said annular portion located over said filter tube.

54. The apparatus for improved filtration effectiveness in refrigeration systems, as defined in claim 53, further comprising said filter tube located between said L-shaped portion and said annular portion for sealing engagement with said retainer.

55. The apparatus for improved filtration effectiveness in refrigeration systems, as defined in claim 52, further comprising a supporting member frictionally located between said annular portion and said filter tube for tubular support.

56. The apparatus for improved filtration effectiveness in refrigeration systems, as defined in claim 55, further comprising said supporting member is crimped over an end of said filter material for sealing said end of said material.

57. The apparatus for improved filtration effectiveness in refrigeration systems, as defined in claim 1, further comprising said filter tube having at least one layer of filter material.

58. The apparatus for improved filtration effectiveness in refrigeration systems, as defined in claim 1, further comprising said core assembly having a modified first closure member, a modified second closure member, a modified second end cap, and a modified tubular core.

59. The apparatus for improved filtration effectiveness in refrigeration systems, as defined in claim 58, further comprising said modified first closure member having a circular end piece having a central threaded opening to receive a fastening means.

60. The apparatus for improved filtration effectiveness in refrigeration systems, as defined in claim 59, further comprising said fastening means is a bolt.

61. The apparatus for improved filtration effectiveness in refrigeration systems, as defined in claim 58, further comprising said modified first closure member is substantially circular in shape and having an outwardly facing perimetral channel.

62. The apparatus for improved filtration effectiveness in refrigeration systems, as defined in claim 61, further comprising said outwardly facing perimetral channel having a seal.

63. The apparatus for improved filtration effectiveness in refrigeration systems, as defined in claim 58, further comprising said modified first closure member having a perimetral groove for receiving said first end of said tubular core.

64. The apparatus for improved filtration effectiveness in refrigeration systems, as defined in claim 58, further comprising said modified second closure member is substantially annular in shape and has a first groove for accepting said second end of said tubular core.

65. The apparatus for improved filtration effectiveness in refrigeration systems, as defined in claim 58, further comprising said modified tubular core is substantially constructed of expanded metal mesh for attachment to said modified second closure member.

66. The apparatus for improved filtration effectiveness in refrigeration systems, as defined in claim 58, further comprising said modified second closure member having a second groove for communication with a central opening located within said second end cap.

67. The apparatus for improved filtration effectiveness in refrigeration systems, as defined in claim 58, further comprising said modified second end cap having a seal groove for accepting a seal, a downwardly depending sidewall and an annular, radially extending flange which extends from a distal end of said downwardly depending sidewall.

68. The apparatus for improved filtration effectiveness in refrigeration systems, as defined in claim 67, further comprising said radially extending flange having a diameter smaller than said inside diameter of said housing to locate said desiccant core assembly in said housing.

\* \* \* \* \*